United States Patent [19]

Brown, Jr.

[11] 4,351,257
[45] Sep. 28, 1982

[54] MARINE FENDER

[75] Inventor: Louis S. Brown, Jr., Stephens City, Va.

[73] Assignee: Seaward International, Inc., Falls Church, Va.

[21] Appl. No.: 228,355

[22] Filed: Jan. 26, 1981

[51] Int. Cl.³ .............................................. B63B 59/02
[52] U.S. Cl. .................................... 114/219; 114/267; 405/212
[58] Field of Search .................. 114/219, 267; 9/8 R; 405/212, 215, 216; 264/129, 136, 137, 285, 339

[56] References Cited

U.S. PATENT DOCUMENTS

| | | | |
|---|---|---|---|
| 1,309,668 | 7/1919 | Waite | 264/129 |
| 1,815,413 | 7/1931 | Lockwood | 114/219 |
| 2,179,125 | 11/1939 | Kirlin | 114/219 |
| 2,213,712 | 9/1940 | Marshall | 264/129 |
| 3,113,546 | 12/1963 | Mountcastle | 114/219 |
| 3,339,907 | 9/1967 | Parker | |
| 3,455,269 | 7/1969 | Dean | |
| 3,496,586 | 2/1970 | Kaufman | 114/267 |
| 4,000,532 | 1/1977 | Nielsen | 9/8 R |
| 4,134,610 | 1/1979 | Lindewall | 114/219 X |

FOREIGN PATENT DOCUMENTS

| | | | |
|---|---|---|---|
| 2631353 | 1/1978 | Fed. Rep. of Germany | 114/219 |
| 1449923 | 8/1966 | France | 114/219 |
| 1113032 | 5/1968 | United Kingdom | 114/219 |

Primary Examiner—Trygve M. Blix
Assistant Examiner—Stephen P. Avila
Attorney, Agent, or Firm—Finnegan, Henderson, Farabow, Garrett & Dunner

[57] ABSTRACT

A marine fender having high energy absorption capacity, low reaction force, a smooth exterior surface and no extensive exterior support structure to preclude snagging and reduce maintenance is provided. The fender comprises a resilient core having a cylindrical central portion tapering at each end to a truncated cone-shaped end portion, a fitting at each end of the core disposed coaxially with an axial bore in the core, flexible strength member in the axial bore interconnecting the fittings and providing means for adjustably biasing the fittings toward each other, and a flexible elastomeric skin enclosing the core and substantial portions of each fitting to protect the core from wear and abrasion and to distribute impact loads evenly over the core and fittings.

20 Claims, 12 Drawing Figures

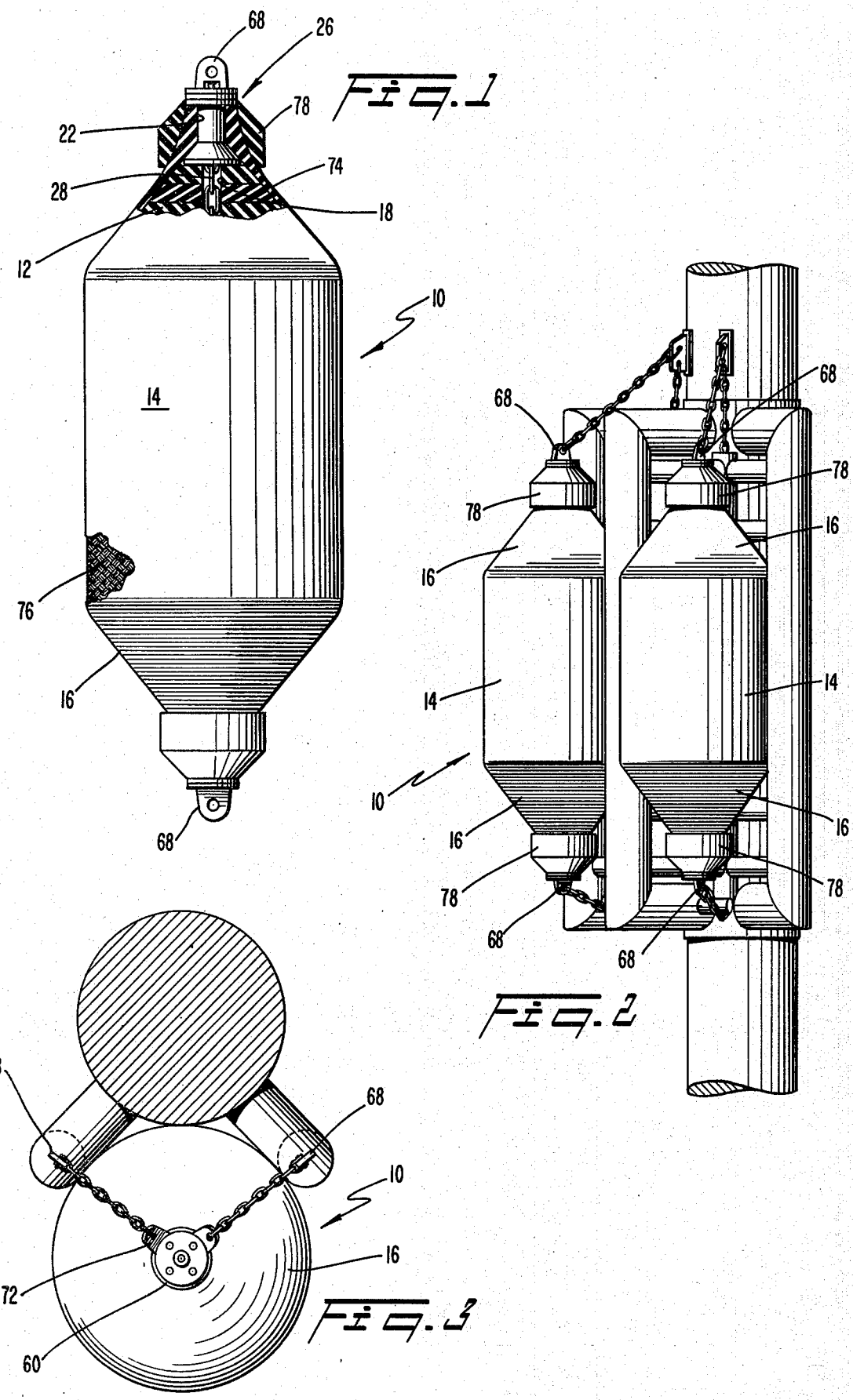

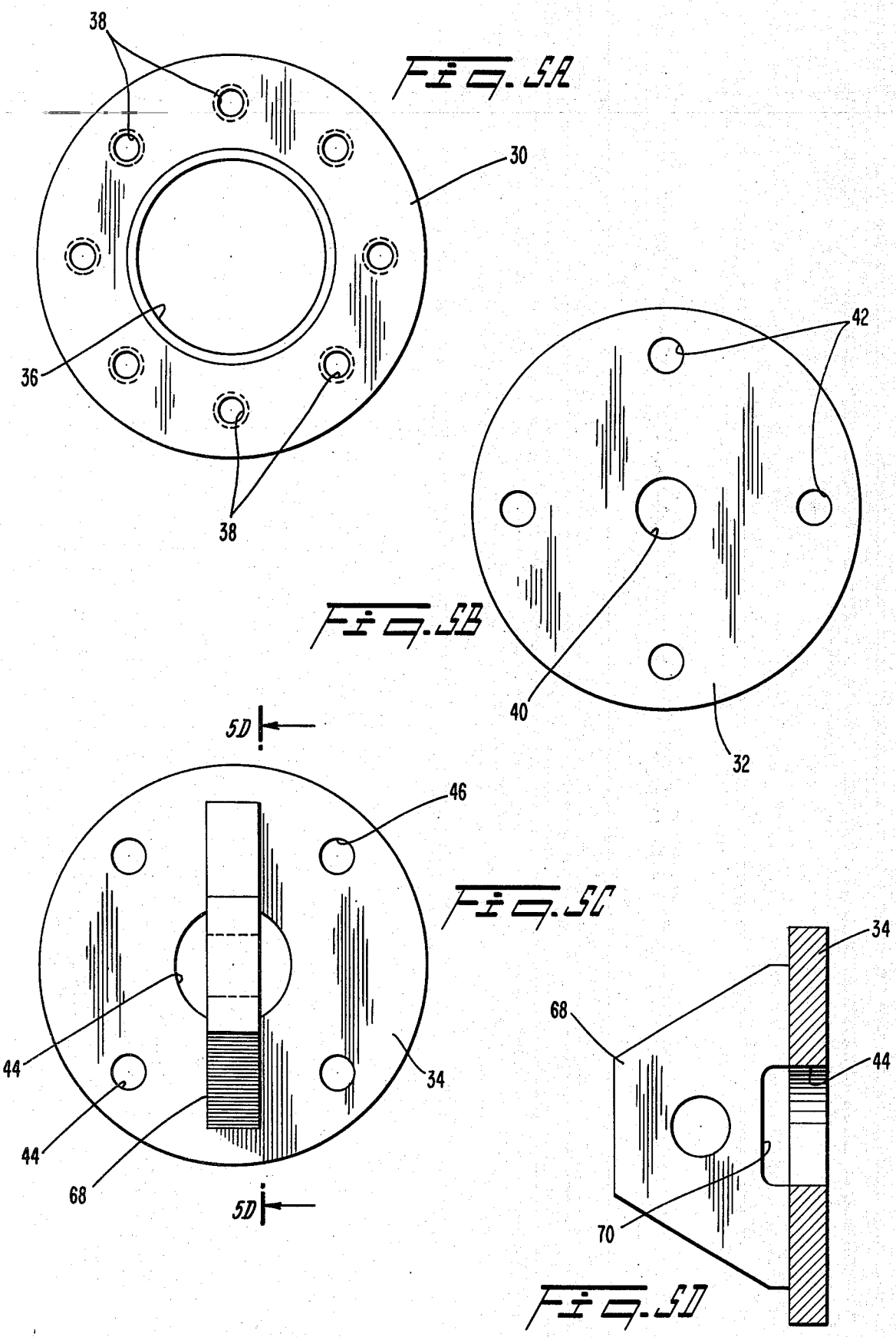

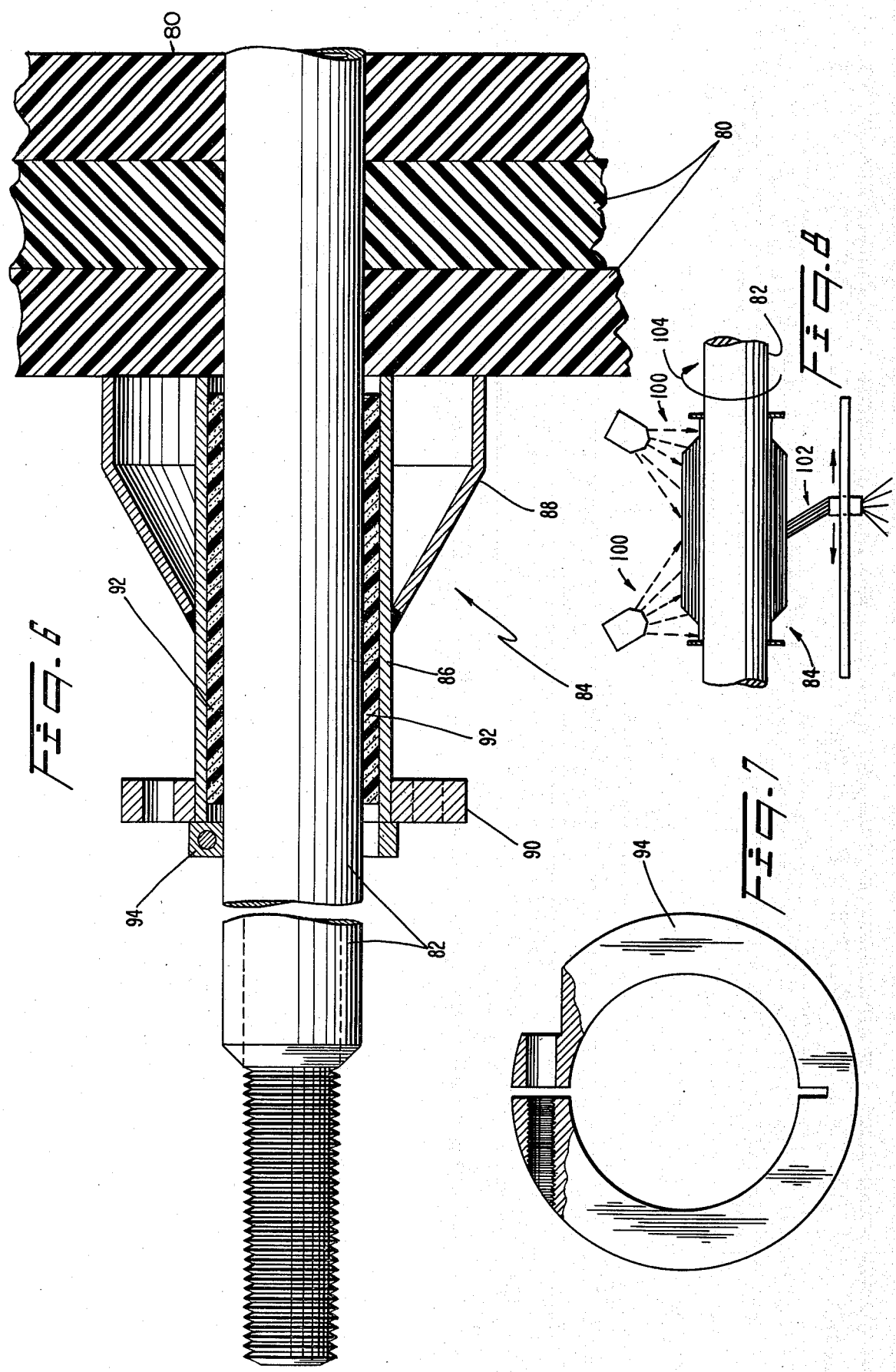

MARINE FENDER

BACKGROUND OF THE INVENTION

1. Field of Invention

This invention relates to marine fenders. More particularly, this invention is directed to an improved marine fender having high energy absorbtion capacity and low reaction force and a shape and structure which eliminates expensive framework and external support material subject to snagging and frequent maintenance.

2. Description of the Prior Art

Marine fenders are used to absorb the impact energy between two ships, a ship and a quay or pier, a vessel and an off-shore oil platform, and other similar situations. Many types of fenders have been used for these various purposes, including bundles of rope and wood floats.

Currently most existing fender systems fall into one or more of three broad categories: (1) solid elastomeric shapes, (2) shock cells, and (3) low pressure fendering.

Solid elastomeric fenders include extruded or molded rubber shapes which will absorb a large amount of energy, but, because of the high compressive resistance of the elastomers, have small deflection and high reaction force. The high reaction force of this type fender generally limits its use to areas where vessel approach velocities are low or where vessels are small. Normally this type of fender is used with vessels, piers and docks in protected waters or for small boat landing on off-shore oil platforms.

Shock cell fenders usually incorporate solid elastomeric fenders on a metal frame with shock cells between the frame and the structure being fendered. The shock cells may be bodies of elastomeric material or may employ hydraulics, pneumatics, springs, etc. Shock cells generally absorb large amounts of enegy but also have high reaction forces. This type of fendering requires extensive metal framework and frequent maintenance, particularly in the case of pneumatic or hydraulic shock cells. Shock cell fenders are usually limited to use in fixed locations such as on off-shore oil platforms.

Low pressure fenders generally consist of an elastomeric skin filled with pressurized air or resilient foam. Usually these fenders operate at a contact pressure between 5 psi and 75 psi compared to several hundred psi for solid elastomeric and shock cell fenders. Low pressure fenders are usually contained within nets made of chain or wire rope and frequently incorporate used tires or rubber extensions as part of the net. The net is necessary to provide means for handling the fender or for transmitting loads from the fender to the rigging attaching the fender to the structure.

Low pressure fenders filled with air pressure require frequent monitoring of the inflation pressure and are subject to exploding or deflating if punctured. Both air and foam filled fenders require maintenance of the nets which are subject to snagging and wear. This type of fender is in widespread use in ship-to-ship and ship-to-dock applications, but is little used on off-shore oil platforms.

The fender of the invention combines many of the advantages of the three types of prior art fenders while eliminating their disadvantages. The unique design provides a fender having the high energy absorption capacity of solid elastomeric fenders and shock cell fenders and the low reaction force of the low pressure fenders. The fender design eliminates external nets common to low pressure fenders thus reducing maintenance and eliminating wear and snagging problems. The conical shape of the ends of the fender reduces the potential for snagging the fender on structure or vessel overhang, a common problem with cylindrical-shaped fenders.

While the fender of the invention has the high energy absorption capacity of solid elastomeric fenders, it is generally of larger diameter than the solid fenders thereby providing more stand-off distance between the vessel and the structure being fendered. In most instances this is advantageous, particularly with large vessels and in rough-sea situations such as for off-shore oil platforms.

Unlike shock cell fenders, the invention does not require an extensive steel framework and separate shock cells, thereby reducing the cost of the fendering system and the maintenance required. Furthermore, although providing energy absorption comparable to a shock cell fender, the invention is more versatile in use since it does not have the extensive structural framework; it may be easily relocated or removed and replaced.

SUMMARY OF THE INVENTION

The objects and advantages of the invention are set forth in part in the description which follows and in part will be obvious from the description, or may be learned by practice of the invention. The objects and advantages of the invention may be realized and attained by means of the instrumentalities and combinations particularly pointed out in the appended claims.

In accordance with the purpose of the invention, as embodied and broadly described herein, the fender of this invention comprises a resilient core for absorbing energy upon repeated compression having a cylindrical central portion tapering at each opposed end thereof to a truncated cone-shaped end portion and having an axial bore; a fitting secured to each end portion including a tubular central member disposed coaxially with the axial bore, an annular seat integral with one end of the central member proximate the core having a diameter greater than the central member, and an annular flange secured to the other end of the central member; flexible strength means disposed in the axial bore and the bores of the opposed central members cooperating with the flange of each fitting for interconnecting the fittings and adjustably biasing the fittings axially toward each other; and a flexible elastomeric skin enclosing the core and the central member and seat of each fitting to protect the core from wear and abrasion and to distribute impact loads evenly over the core and fittings.

In a preferred embodiment, an elastomeric collar is disposed around the portion of the skin enclosing the central member and seat of each fitting for protecting the skin from abrasion and for absorbing compressive impact energy.

Preferably the fender core is formed of a resilient plastic foam having a density in a range of 2–60 lbs/cu.ft.

It is also preferred that the fender further comprise elongated reinforcing fibers embedded within the skin and encircling the core and fittings at an angle to the longitudinal axis of the core. The elongated reinforcing fibers may be arranged in overlapping swaths each comprising a plurality of substantially parallel fibers, the swaths intersecting each other at approximately 45° and being wrapped around the core, the fittings and back around the core.

Preferably each of the opposed ends of the strength means is adjustably attached to a respective flange secured to the respective fitting, and means for attaching the fender to a structure is also secured to one or both of the opposed flanges.

Also in accordance with the invention, a method of manufacturing the marine fender comprises applying resilient plastic foam material around an elongated mandrel; shaping the foam material to form a core having a substantially cylindrical central section tapering at each opposed end to a truncated cone-shaped end portion and having an axial bore around the mandrel; placing a fitting around the mandrel at each end of the core, the fitting having a tubular central member located around the mandrel coaxial with the bore, an annular seat integral with one end of the central member abutting the core, and an annular flange secured to the other end of the central member; axially securing each fitting to the mandrel by means of a lock collar secured to the mandrel; while rotating the mandrel, core and fittings around their common axis, concurrently applying liquid elastomeric material to form an elastomeric skin around the core and the central member and seat of each fitting and wrapping swaths of elongated reinforcing fibers around the core and the central member and seat of each fitting to embed the fibers in the skin; removing the mandrel; inserting a flexible strength means in the bore and central member of each fitting; adjustably securing each end of the flexible strength means to a respective annular flange; and securing to at least one flange means for external attachment of the fender to a structure.

Preferably, the method further includes, prior to removing the mandrel, the step of molding an elastomeric collar around the skin enclosing the central member and seat of each fitting.

BRIEF DESCRIPTION OF THE DRAWINGS

The accompanying drawings, which are incorporated in and constitute a part of this specification, illustrate one embodiment of the invention and, together with the description, serve to explain the principles of the invention.

FIG. 1 is a partial cutaway side view of the fender of the invention.

FIG. 2 is an elevation view of the fender of FIG. 1 mounted in place.

FIG. 3 is a top view of another mounting method for the fender of the invention.

FIGS. 5A-D and plan views of components of the fitting of an embodiment of the invention.

FIG. 6 depicts the structure used in manufacture of the fender.

FIG. 7 depicts the lock ring used in manufacture of the fender.

FIG. 8 schematically represents the method of manufacture of the invention.

DETAILED DESCRIPTION OF THE PREFERRED EMBODIMENT

Figure 4:
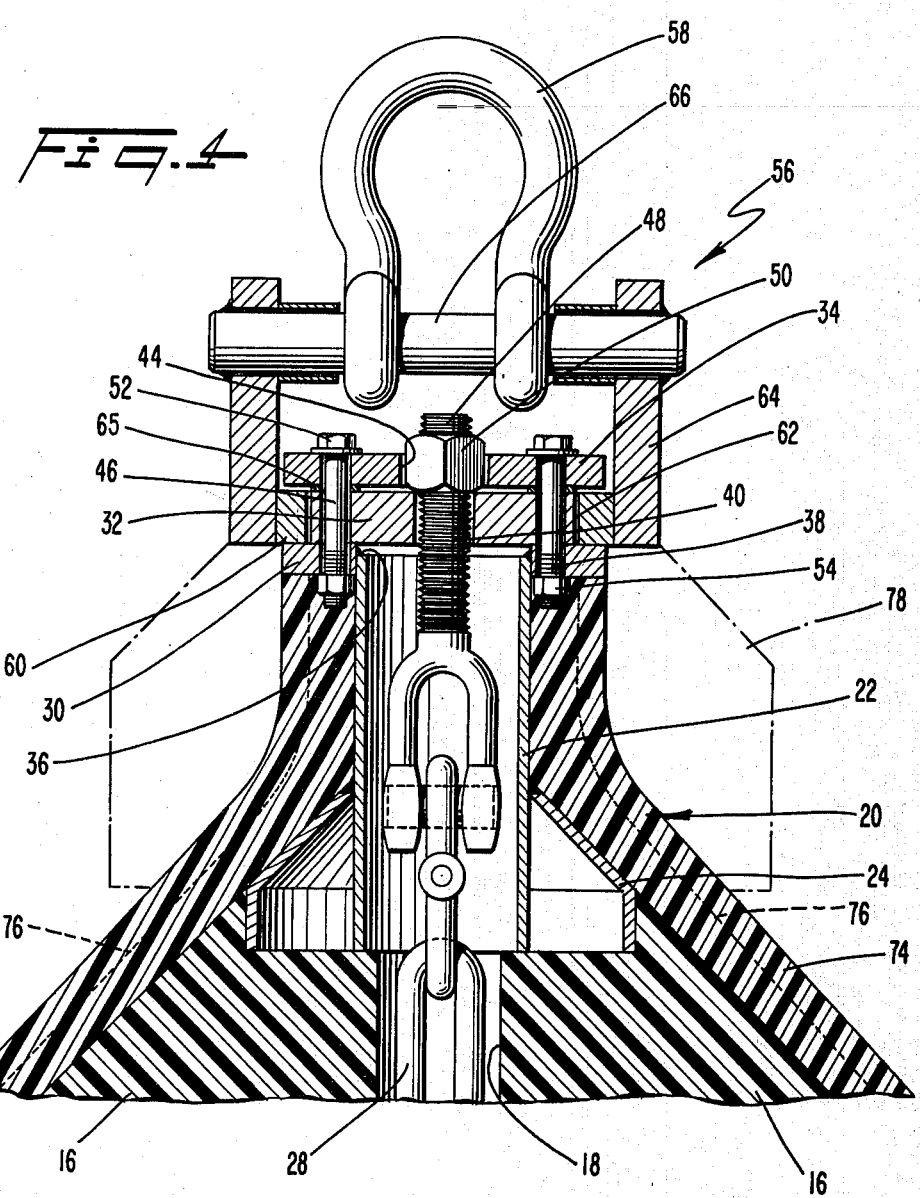
FIG. 4 is a cross-sectional view of one end of an embodiment of the invention.

Reference will now be made in detail to the present preferred embodiment of the invention, an example of which is illustrated in the accompanying drawings.

In accordance with the invention, the marine fender comprises a resilient core for absorbing energy upon repeated compression having a cylindrical central portion tapering at each opposed end thereof to a truncated cone-shaped end portion and having an axial bore.

As here embodied and depicted in FIG. 1, the marine fender 10 comprises a resilient core 12 having a cylindrical central portion 14 tapering at each opposed end thereof to a truncated cone-shaped end portion 16 and having an axial bore 18.

Preferably the resilient core 12 is formed of a resilient, plastic foam having a density of from 2 to 60 pounds per cubic foot. The plastic foam may be polyethylene, ethylene vinyl acetate, vinyl urethane, styrene butadiene, or such other plastics or elastomers or copolymers or alloys of such.

The foam may be arranged in slabs around the bore 18 and shaped to form the central portion 14 and truncated cone-shaped end portions 16.

In accordance with the invention, a fitting is disposed at each end portion of the core. Each fitting includes a tubular central member coaxial with the bore of the core, an annular seat integral with one end of the central member proximate the core with a diameter greater than the central member, and an annular flange means secured to the other end of the central member.

As embodied herein and depicted in FIGS. 1 and 4, a fitting 20 is disposed at each end portion of the core 12. Each fitting 20 includes a tubular central member 22 coaxial with the bore 18 of the core 10. An annular seat 24 integral with one end of the central member 22 has a diameter greater than the central member 22 and is disposed proximate the respective end portion 16 of the core 12. Annular flange means 26 is secured to the other end of the central member 22.

Preferably the annular seat 24 has a substantially truncated cone shape and is secured to the outer periphery of the one end of the central member 22 coaxial with the bore of the central member 22. The annular seat 24 may be an annular flange having truncated cone shape welded to the central member 22 with the base of the flange being substantially coplanar with the end of the central member.

Each fitting 20 is disposed such that the base of the annular seat 24 is in abutting relationship with the truncated apex of the respective end portion 16.

In accordance with the invention, flexible strength means is disposed in the co-axial bores of the core and opposed central members cooperating with the flange means of the fittings for interconnecting the fittings and adjustably biasing the fittings axially toward each other.

Preferably, flange means 26 includes means for permitting external attachment of the fender 10 to a structure. As depicted in the embodiment of FIG. 4, flange means 26 comprises flange 30 welded around the end of the central member 22 in a plane substantially parallel to the base of the annular seat 24, first plate 32 disposed on flange 30 and over the open end of central member 22, and second plate 34 disposed on first plate 32.

As seen in FIGS. 4 and 5A, flange 30 has a central opening 36 for receiving the end of the central member 22 and a plurality of holes 38 spaced around the central opening 36.

First plate 32 (FIGS. 4 and 5B) has a central opening 40 disposed coaxial with the bore of central member 22 and a plurality of holes 42 disposed coaxial with holes 38 in flange 30.

Second plate 34 (FIGS. 4 and 5C) has a central opening 44 coaxial with central opening 40 in first plate 32 and a plurality of holes 46 coaxial with holes 42 in first plate 32.

As seen in the embodiment depicted in FIG. 4, flexible strength means may be a chain 28. Preferably, at each end of chain 28 is a threaded element 48 which cooperates with first plate 32 of each fitting for interconnecting the fittings and adjustably biasing the fittings toward each other. The flexible strength means may also be wire or synthetic rope having a threaded element at each end thereof. The flexible strength means permits biasing fittings 20 toward each other and permits transmitting forces from one end of fender 10 to the other end.

Each threaded element 48 is slidably received in central opening 40 of the each respective first plate 32 and secured to the respective first plate 32 by nut 50. Central opening 40 in first plate 32 had a diameter large enough to slidably receive threaded element 48 but small enough to permit tightening of nut 50 to bias fittings 20 together. The central opening 44 in second plate 34 has a diameter sufficiently large to receive nut 50. Tightening of nut 50 biases fittings 20 toward each other, thus placing core 12 in compression.

First plate 32 is sandwiched between flange 30 and second plate 34. Bolts 52 in coaxial holes 38,42 and 46 in flange 30, first plate 32 and second plate 34, respectively, secure the first and second plates 32,34 to flange 30. The holes 38 in flange 30 may be threaded for receiving the threaded end of bolts 52. Preferably, nuts 54 are welded to the bottom of flange 30 coaxial with holes 38 for threadably receiving to threaded ends of bolts 52 to secure first and second plates 32,34 and flange 30 together.

Figure 4A:
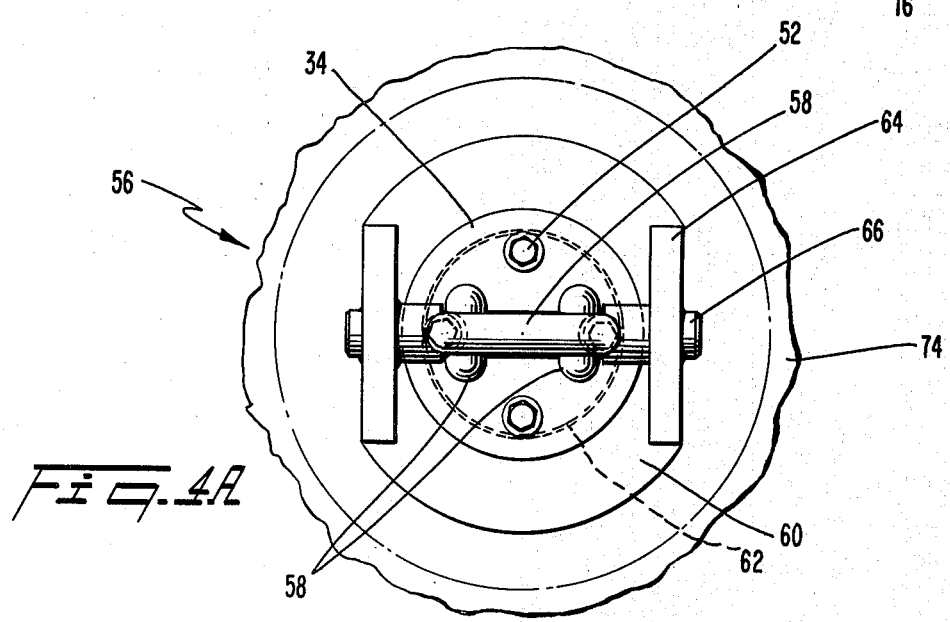
FIG. 4A is a top view of the fender depicted in FIG. 4.

Second plate 34 also provides means for permitting external attachment of fender 10 to a structure. In the embodiment depicted in FIGS. 4 and 4A, second plate 34 secures swivel plate assembly 56 to at least one fitting 20. Swivel plate 56 carries shackle 58 which provides means for securing fender 10 to a structure. A shackle 58 may be located at one or both ends of fender 10.

Swivel plate assembly 56 includes swivel plate 60 having a central opening 62 and a pair of opposed, parallel clevis plates 64 secured to the swivel plate 60. First plate 32 has a diameter less than that of second plate 34 and flange 30 and fits in central opening 62 of swivel plate 60. Swivel plate assembly 56 is secured to fender 10 by securing swivel plate 60 between flange 30 and second plate 34 proximate their periphery. Bushing 65 are located between first and second plates 32,34 permitting rigid attachment of the first and second plates to flange 30 while leaving space between second plate 34 and flange 30 at their peripheries to permit rotation of swivel plate 60 around the fender axis. Shackle 58 is rotatably carried on rod 66 secured between clevis plates 64.

Alternatively, attachment to the fender 10 may be to a single clevis plate 68 secured to the center of second plate 34 of one or both fittings 20. As seen in FIGS. 2, 5C and 5D, clevis plate 68 is welded transverse second plate 34. The bottom of clevis plate 68 has a notch 70 permitting access to nut 50 disposed in central opening 44 of second plate 34. In this embodiment the diameter of first plate 32 may be the same as flange 30 and second plate 34.

A second alternative for securing fender 10 to a structure is depicted in FIG. 3. In this embodiment two clevis plates 72 are secured to swivel plate 60 in position to permit attachment of fender 10 to a structure through both clevis plates 72. Fender 10 may rotate about its axis due to the structure discussed with respect to FIG. 4 which permits swivel plate 60 to rotate about the fender axis.

In accordance with the invention, a flexible elastomeric skin encloses the core and the central member and seat of each fitting to protect the core and fittings from wear and abrasion and to distribute impact loads evenly over the core and fittings.

In a preferred embodiment (FIGS. 1 and 4), flexible elastomeric skin 74 covers the core 12 and central member 22 and annular seat 24 of both fittings 20. The skin 74 abuts the bottom of flange 30 and also covers nuts 54 which are secured to the bottom of flange 30. By enclosing central member 20 and annular seat 24 of each fitting within the skin 74 the fittings are held captive within the skin and forces are evenly transmitted from fittings 20 to skin 74. The skin may be an elastomer such as polyurethane, natural rubber, synthetic rubber or vinyl.

Preferably, elongated reinforcing fibers 76 are embedded in skin 74 and encircle core 12 and fittings 20 at an angle to the axis of fender 10. It is preferred that the fibers 76 be substantially continuous and embedded in the skin in overlapping swaths comprising a plurality of substantially parallel fibers. The swaths of fibers intersect to each other at approximately 45°, as seen in FIG. 1, and are wrapped around core 12, fittings 20 and back around core 12 to strengthen the entire structure and to distribute loads over the entire core and both fittings. The fiber 76 may be, for example, nylon, polyester or aromatic polyamide.

In the preferred embodiment, an elastomeric collar surrounds the portion of the skin enclosing the central member and seat of each fitting for protecting the skin from abrasion and for absorbing compressive impact energy. As depicted in FIGS. 1, 2 and 4, collar 78 is a molded annular member encircling central member 22, substantially all of annular seat 24 and flange 30 of each fitting 20 outside skin 74. Collar 78 may be made of molded polyurethane, natural rubber or synthetic rubber and may have a diameter 40 to 50% of the diameter of central portion 14 of core 12.

In accordance with the invention, the method of manufacturing the fender comprises applying resilient, plastic foam material around an elongated mandrel and shaping the foam material to form a core having a substantially cylindrical central section tapering at each opposed end thereof to a truncated cone-shaped end portion and having an axial bore around the mandrel.

As depicted in FIG. 6, slabs of foam material 80 are secured to each other around a mandrel 82. The mandrel 82 creates a bore in the core formed by the foam material 80. It may be preferred to place a cylindrical liner around the mandrel and securing the foam to the liner. The liner would serve to protect the interior of the bore from abrasion by a flexible strength means such as chain placed in the bore. After the slabs of foam 80 are secured in place, the core is shaped to form a substantially cylindrical central portion tapering at each end to truncated-cone shaped end portions.

In accordance with the invention, the method further comprises the steps of placing a fitting around the mandrel at each end of the core, each fitting having a tubular central member located around the mandrel coaxial with the core bore, an annular seat integral with one end of the central member abutting the core, and an annular flange secured to the other end of the central member. Each fitting is axially secured to the mandrel by means of a lock collar secured to the mandrel.

In the preferred method, a fitting 84 is placed around mandrel 82 at each end of the foam 80 forming the core. Fitting 84 includes central member 86 located around mandrel 82 coaxial with the core, annular seat 88 integral with one end of central member 86 abutting the core at each end thereof, and annular flange 90 secured to the other end of the central member 86. It may be preferred to place a cylindrical layer of foam material 92 around the mandrel inside each central member 86. This compensates for the diameter of the central member 86 which is greater than the base of the core.

A lock collar 94 (FIGS. 6 and 7) is secured around the mandrel 82 at each end thereof abutting the central member 86 and flange 90 for axially securing each fitting 84 in place.

In accordance with the invention, the method further comprises the steps of concurrently applying liquid elastomeric material to form an elastomeric skin around the core and each fitting and wrapping swaths of elongated reinforcing fibers around the core and fittings to embed the fibers in the skin while rotating the mandrel, core, and fittings around their common axis. Preferably the skin with embedded fibers is continuous between the opposed flanges of the opposed fittings. As seen in FIG. 8, liquid elastomeric material 100 is applied to core and fittings 84 and swaths of fibers 102 are wrapped around core and fittings 84 while mandrel 82 is rotated as depicted by arrow 104.

After the skin material has dried, an elastomeric collar may be molded around the skin enclosing the central member and seat of each fitting. Preferably, each collar may be molded to also encircle the flange secured to each fitting.

The method of the invention further includes the steps of removing the mandrel, inserting flexible strength means in the bore of the core and central member of each fitting, adjustably securing each end of the flexible strength means to a respective flange, and securing to each flange means for attaching the fender to a structure.

More particularly, referring to FIGS. 4 and 6, the method includes, after forming the core 16 and fixing the fittings 84 to the mandrel 82, applying skin 74 and fibers 76 while rotating the mandrel 82, core and fittings 84. Mandrel 82 is then removed by removing lock collars 94. The cylindrical layer of foam material 92, if used, should be removed with the mandrel 82.

Chain 28 is inserted in bore 18 and central members 22. Flange means 26 is then assembled and swivel plate assembly 56 and threaded element 48 are secured to the flange means 26.

In the preferred method, before mandrel 82 is removed and after skin 74 dries, collar 78 may be molded in place around each fitting 84.

It will be apparent to those skilled in the art that various modifications and variations could be made in the fender and manufacturing method of the invention without departing from the scope or spirit of the invention.

What I claim is:

1. A marine fender, comprising:
   (a) a resilient core for absorbing energy upon repeated compression having a cylindrical central portion and opposed end portions each tapering to a truncated cone shape and having an axial bore;
   (b) a fitting disposed at each said end portion including a tubular central member disposed coaxially with said axial bore, a truncated cone-shaped annular seat integral with said central member cooperating with the axially adjacent end portion to extend the cone shape of the adjacent end portion to said central member, and annular flange means secured to said central member;
   (c) flexible strength means disposed in said axial bore and the bores of said opposed central members cooperating with said flange means of each said fitting for interconnecting said fittings and adjustably biasing said fittings axially toward each other;
   (d) a flexible, elastomeric skin integrally encasing said core and the central member and seat of each said fitting; and
   (e) an overlapping web of elongated reinforcing fibers embedded in said skin integrally encircling said core and the annular seat of each said fitting, said web distributing impact loads over the surface of said core and conducting forces of impact loads to said fittings.

2. The marine finder of claim 1 further comprising elastomeric collar means surrounding the portion of said skin enclosing the central member and seat of each said fitting for protecting said skin from abrasion and for absorbing compressive impact energy.

3. The marine fender as in claim 1 wherein said core is formed of a resilient, plastic foam having a density in a range from 2 to 60 pounds per cubic foot.

4. The marine fender as in claim 3 wherein said plastic foam is selected from the group consisting of polyethylene, ethylene vinyl acetate, vinyl urethane and styrene butadiene.

5. The marine fender as in claim 1 wherein said skin is a elastomer selected from the group consisting of polyurethane, natural rubber, synthetic rubber, and vinyl.

6. The marine fender as in claim 1 wherein said fiber is made of a material selected from the group consisting of nylon, polyester and aromatic polyamide.

7. The marine fender as in claim 1 wherein said fibers are substantially continuous and are embedded in said skin in overlapping swaths comprising a plurality of substantially parallel fibers, said swaths intersecting each other at approximately 45° and being wrapped around said core, around said fittings, and back around said core.

8. The marine fender as in claim 1 further comprising means secured to at least one said flange means for permitting external attachment of said fender to a structure.

9. The fender as in either claim 1 or 8, wherein said flange means comprises a plate secured to the other end of each said central member and wherein said flexible strength means is a chain having a threaded element at each end thereof, each said threaded element being adjustably secured to a respective plate for drawing said plates toward each other to place said core in compression.

10. The marine fender as in claim 8 wherein said flange means comprises an annular flange integrally secured to the outer periphery of the other end of each said central member, a first plate disposed on said flange and over the top of said central member having a centrally located first hole coaxial with said central member, a second plate disposed on said first plate having a centrally located second hole coaxial with and larger than a said first hole, and means proximate the periphery of said flange and said plates for securing said first and second plates to said flange, and wherein said strength means includes a threaded element at each end thereof extending through the centrally located holes in said first and second plates of each said fitting and a nut disposed in the centrally located hole of each said second plate threadably engaging each said element for adjustably biasing said first plates toward each other and imposing compressive force on said core.

11. The marine fender as in claim 10 wherein said external attachment means is a clevis plate secured to said second plate.

12. The marine fender as in claim 10 wherein said external attachment means is a swivel plate for receiving a shackle secured to said second plate.

13. The marine fender as in claim 10 wherein said strength means is a chain.

14. The marine fender as in claim 10 wherein said strength means is a wire.

15. The marine fender as in claim 10 wherein said strength means is a synthetic rope.

16. The marine fender as in claim 2 wherein said collar means is an annular member molded around each said fitting outside said skin extending between said flange means and proximate the apex of said end portion.

17. The marine fender as in claim 16 wherein said collar is a resilient material selected from the group consisting of polyurethane, natural rubber and synthetic rubber.

18. A method of manufacturing a marine fender, comprising:
 (a) applying resilient, plastic foam material around an elongated mandrel;
 (b) shaping said foam material to form a core having a substantially cylindrical central section tapering at each opposed end thereof to a truncated cone-shaped end portion and having an axial bore around said mandrel;
 (c) placing a fitting around said mandrel at each end of said core, said fitting having a tubular central member located around said mandrel coaxial with said bore, a truncated-cone shaped annular seat integral with said central member cooperating with said end portion to extend the cone shape of said end portion to said central member, and an annular flange secured to said central member;
 (d) axially securing each said fitting to said mandrel by means of a lock collar secured to said mandrel;
 (e) while rotating said mandrel, core and fittings around their common axis, concurrently applying liquid elastomeric material to form an elastomeric skin around said core and the central member and seat of each said fitting and wrapping swaths of elongated reinforcing fibers around said core and the central member and seat of each said fitting to embed said fibers in said skin;
 (f) removing said mandrel;
 (g) inserting flexible strength means in said bore and central member of each said fitting;
 (h) adjustably securing each end of said flexible strength means to said respective annular flange; and
 (i) securing means for external attachment of said fender to a structure to at least one said annular flange.

19. The method of claim 18 further comprising before removing said mandrel the step of molding an elastomeric collar around the skin enclosing the central member and seat of each said fitting.

20. A marine finder, comprising:
 (a) core means for resiliently receiving repeated compression, said core means having a cylindrical central portion tapering at each opposed end thereof to a truncated cone-shaped end portion and having an axial bore;
 (b) fitting means coaxially disposed at each said end portion for transmitting external forces imposed on said fender to a support structure, each said fitting means comprising a truncated cone-shaped element coaxial with said core means and cooperating with an axially adjacent end portion to continue the cone shape thereof;
 (c) flexible strength means disposed in said axial bore for interconnecting said fittings and for adjustably biasing said fittings axially toward each other;
 (d) one-piece, flexible skin means for integrally encasing said core means and both said fitting means; and
 (e) elongated fiber means embedded in said skin means and disposed in an overlapping web encircling said core means and the truncated cone-shaped element of each said fitting means for conducting said forces to said fitting means and for evenly distributing said forces over the surface of said core means.

* * * * *